United States Patent
Mulasmajic et al.

(10) Patent No.: US 11,806,628 B2
(45) Date of Patent: Nov. 7, 2023

(54) SYSTEMS AND METHODS FOR ANTI-CHEAT DETECTION

(71) Applicant: Riot Games, Inc., Los Angeles, CA (US)

(72) Inventors: Nemanja Mulasmajic, Los Angeles, CA (US); Nicolas Peterson, Los Angeles, CA (US)

(73) Assignee: Riot Games, Inc., Los Angeles, CA (US)

( * ) Notice: Subject to any disclaimer, the term of this patent is extended or adjusted under 35 U.S.C. 154(b) by 0 days.

(21) Appl. No.: 17/742,021

(22) Filed: May 11, 2022

(65) Prior Publication Data

US 2022/0266150 A1 Aug. 25, 2022

Related U.S. Application Data

(63) Continuation of application No. 17/223,954, filed on Apr. 6, 2021, now Pat. No. 11,439,911.

(60) Provisional application No. 63/006,670, filed on Apr. 7, 2020.

(51) Int. Cl.
  *A63F 13/75* (2014.01)
  *H04L 9/40* (2022.01)
  *A63F 13/77* (2014.01)
  *A63F 13/73* (2014.01)

(52) U.S. Cl.
  CPC .............. *A63F 13/75* (2014.09); *A63F 13/73* (2014.09); *A63F 13/77* (2014.09); *H04L 63/10* (2013.01); *A63F 2300/535* (2013.01); *A63F 2300/5586* (2013.01)

(58) Field of Classification Search
  CPC .......... A63F 17/75; A63F 17/73; A63F 17/77; A63F 2300/5586; H04L 63/1425
  See application file for complete search history.

(56) References Cited

U.S. PATENT DOCUMENTS

| 7,634,800 | B2 | 12/2009 | Ide et al. |
| 10,427,048 | B1 | 10/2019 | Lundquist et al. |
| 11,040,285 | B1 | 6/2021 | Lundquist et al. |

(Continued)

OTHER PUBLICATIONS

International Preliminary Report on Patentability received for PCT Application No. PCT/US2021/026247, dated Oct. 20, 2022, 9 pages.

(Continued)

*Primary Examiner* — James S. McClellan
(74) *Attorney, Agent, or Firm* — SHOOK, HARDY & BACON L.L.P.

(57) ABSTRACT

Embodiments of the present disclosure provide systems, methods, and computer storage media directed to anti-cheat detection in online multiplayer video games. An anti-cheat kernel driver adapted to validate and secure a system state of a gaming device is loaded during a booting process of the gaming device. The loaded anti-cheat kernel driver ensures that the system state cannot be tampered with from the time of boot through the duration of gameplay. The loaded anti-cheat kernel driver can also receive anti-cheat modules communicated to the gaming device from an anti-cheat server, so that anti-cheat modules are received and executed on an ad hoc basis dictated by the anti-cheat server. The anti-cheat server can autonomously manage the anti-cheat operations performed on a kernel layer or application layer of the gaming device, and conduct anti-cheat mitigation operations if necessary.

20 Claims, 6 Drawing Sheets

(56) References Cited

U.S. PATENT DOCUMENTS

| | | |
|---|---|---|
| 2003/0064801 A1 | 4/2003 | Breckner et al. |
| 2008/0305869 A1 | 12/2008 | Konforty et al. |
| 2009/0143144 A1 | 6/2009 | Schluessler et al. |
| 2010/0223656 A1 | 9/2010 | Ray et al. |
| 2012/0079472 A1 | 3/2012 | Lenger |
| 2014/0051522 A1 | 2/2014 | Robb |
| 2016/0260283 A1 | 9/2016 | Little et al. |
| 2018/0365424 A1 | 12/2018 | Callaghan et al. |

OTHER PUBLICATIONS

Notice of Allowance received for Korean Patent Application No. 10-2022-7038283, dated Nov. 17, 2022, 6 pages. [English translation submitted].

"A New Dawn", BattlEye—The Anti-Cheat Gold Standard | News, Retrieved from Internet URL: https://www.battleye.com/news/, accessed on Aug. 8, 2022, pp. 4 (Feb. 9, 2015).

Suter, B., "BattlEye—The Anti-Cheat Gold Standard | About, BattlEye", Anticheat Software, Retrieved from Internet URL: https://www.battleye.com/about/, accessed on Aug. 8, 2022, pp. 4.

"Cat And Mouse—ESEA Anti-Cheat", ESEA Technical, ESL Gaming Online, Inc., Retrieved from the Internet URL : https://blog.esea.net/esea-hardware-cheats/?msclkid=a42d7f4cb43211ecb0bca32f0eab7bb7, pp. 1-9, (Oct. 23, 2018).

"Easy Anti-Cheat", Easy Anti Cheat Software, Epic Games, Retrieved from Internet URL: https://www.easy.ac/en-us/, accessed on Aug. 8, 2022, pp. 5.

"Anti-Cheat Kernel Driver—League of Legends", Riot Games, Retrieved from Internet URL: https://www.leagueoflegends.com/en-au/news/dev/dev-null-anti-cheat-kernel-driver/, accessed on Aug. 8, 2022, pp. 7.

"What kernel-level anti-cheat is and why you should care | LEVVVEL", Retrieved from Internet URL: https://levvvel.com/what-is-kernel-level-anti-cheat-software/, accessed on Aug. 8, 2022, pp. 23.

"PunkBuster", Wikipedia, Retrieved from Internet URL: https://en.wikipedia.org/wiki/PunkBuster, accessed on Aug. 8, 2022, pp. 5.

"Warden (software)—Wowpedia—Your wiki guide to the World of Warcraft", Retrieved from Internet URL : https://wowpedia.fandom.com/wiki/Warden_(software), accessed on Mar. 30, 2022, pp. 9.

"XIGNCODE3", Wellbia.com Co.,Ltd., The Wayback Machine, Retrieved from Internet URL : https://web.archive.org/web/20180404144945/http://www.wellbia.com/home/en/pages/xigncode3/, pp. 4 (Apr. 4, 2018).

Hoffman, C., "What is EasyAntiCheat.exe, and Why Is It On My Computer?, How-To Geek!", Retrieved from Internet URL : https://www.howtogeek.com/358756/what-is-easyanticheat.exe-and-why-is-it-on-my-computer/, accessed on Mar. 30, 2022, pp. 7 (Jul. 11, 2018).

Myrseih, M.O., "Cheat Detection in On-Line Multi-Player Games using Graphics Processing Units", World Wide Web, Retrieved from Internet URL: https://www.duo.uio.no/bitstream/handle/10852/10103/4/Myrseth.pdf, pp. 1-102 (Aug. 3, 2009).

Tim, G., "EA patents new anti-cheat system that rifles through your RAM and terminates malicious software", Critical Hit Gaming, pp. 1-8 (Oct. 8, 2019).

Extended European Search Report and Opinion received for European Patent Application No. 21783778.0, dated Jul. 12, 2023, 5 pages.

SYSTEMS AND METHODS FOR ANTI-CHEAT DETECTION

CROSS-REFERENCE TO RELATED APPLICATIONS

This application is a continuation of and claims priority from U.S. patent application Ser. No. 17/223,954, filed Apr. 6, 2021, which claims priority from U.S. Provisional Patent Application No. 63/006,670, filed Apr. 7, 2020, each of which are assigned or under obligation of assignment to the same entity as this application, the entire contents of the applications being herein incorporated by reference.

BACKGROUND

Utilizing technologies to cheat in online multiplayer gameplay has unfortunately become a prevalent problem. Online gamers can access a variety of publicly or privately available tools, or utilize various hacking techniques, either of which can provide them with an unfair advantage in competitive online gameplay. As competitive eSports continues to gain momentum, the importance of deterring cheaters becomes increasingly important. Unfortunately, as the competitive online gaming industry has grown, the hacking and cheat publishing community has developed a growing industry of its own.

A variety of counteractive measures have been taken to deter the growing practice of cheating in competitive online gameplay. For instance, game mechanics and game designs have been restructured to rule out certain types of cheats. The tracking and sharing of a player's reputation for fair play can also provide a social angle for deterring cheating. Among many other techniques, some more sophisticated methods for detecting or deterring cheating have recently become available. Such methods include: the use of heuristics to determine potential cheats, determining and detecting the digital signature of certain well-known cheats, and even sandboxing game application processes to preclude injection techniques or processes that may modify game processes or memory.

SUMMARY

Embodiments of the present disclosure relate to anti-cheat detection. More specifically, embodiments relate to systems and methods for protecting a system state and memory during boot time of a gaming device. In essence, the described embodiments facilitate the ability to load an anti-cheat kernel driver into an operating system of the computing device at boot time, so that the system state and memory cannot be modified and masqueraded in a way that conventional anti-cheat technologies cannot detect.

In some embodiments, an anti-cheat kernel driver is loaded into a memory of a gaming device as the gaming device is booted, or in other words, as the operating system is loaded into the memory. By virtue of the anti-cheat kernel driver being loaded during boot of the gaming device, a block of memory associated with a game application installed on the gaming device can be protected at a time before certain cheat techniques can be performed. So long as the anti-cheat kernel driver is loaded during boot, cheating technologies as well as the measures taken to masquerade the cheats can be prevented.

In some further embodiments, the gaming device having an anti-cheat kernel driver loaded at boot can establish a network session with a remote anti-cheat server. Based on the network session being established, the gaming device can receive an anti-cheat module that is communicated from the remote anti-cheat server to the gaming device. The gaming device can send the received anti-cheat module to the loaded anti-cheat kernel driver, such that the anti-cheat module can be executed in a kernel of the operating system of the gaming device. A result, generated by virtue of the anti-cheat module being executed, can be communicated from the gaming device to the remote anti-cheat server via the established network session.

The remote anti-cheat server can analyze the result and make a determination that the result is indicative of a cheat technology being utilized on the gaming device. In some further embodiments, the remote anti-cheat server can take anti-cheat measures against the gaming device determined to be utilizing the detected cheating technology. In some aspects, the remote anti-cheat server can notify a gaming server, which can be associated with the remote anti-cheat server, to ban an account associated with the gaming device. In some other aspects, the remote anti-cheat server can notify a gaming server associated with the remote anti-cheat server to ban connections coming from any gaming device that includes one or more pieces of hardware utilized in the gaming device. It is contemplated that in some embodiments, the anti-cheat server, whether independently or via the gaming server, can cause the gaming device to provide for display a graphical alert indicating that cheating technology was detected.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are described in detail below with reference to the attached drawing figures, wherein.

DETAILED DESCRIPTION

Figure 1:
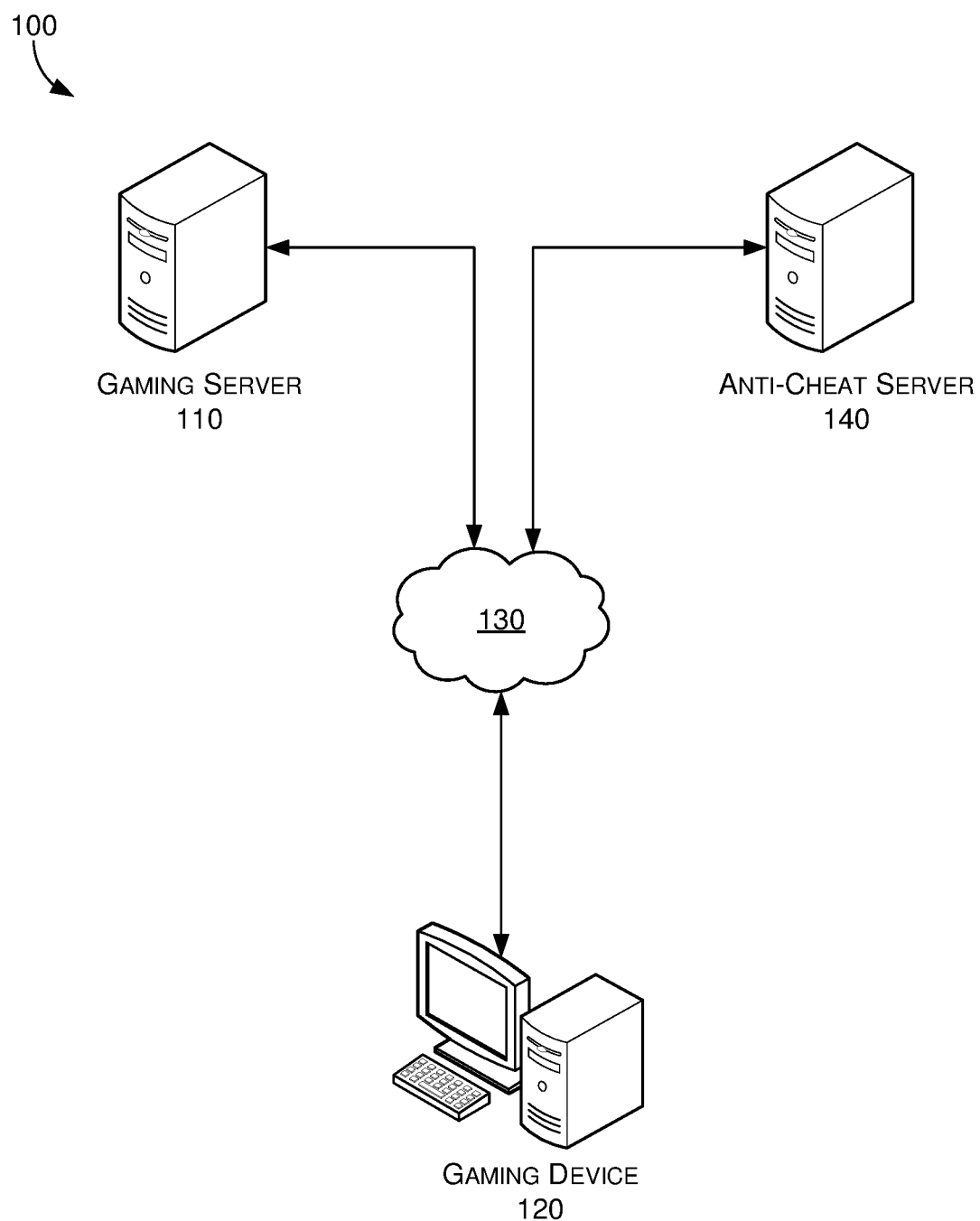
FIG. 1 is an exemplary system diagram in accordance with some embodiments of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The online multiplayer video gaming industry has gained immense popularity across all demographics around the globe. As online multiplayer video games take stage in mainstream media, new industries such as eSports attracts a vast number of gamers (i.e., users with user accounts) having a desire to increase their gaming clout, stand out above others, and win competitive gaming events. As competition grows fierce, many gamers will rise above others in skill and tactical know-how. Others, however, may utilize unfair technical strategies to attain undeserved successes. While there are many different reasons why gamers may utilize cheating technologies in online multiplayer games, game developers look to stop these cheaters in order to provide an even playing field for those who play according to the rules.

There are many types of technical cheats developed and utilized by hackers and gamers. Game exploits, automated user actions, game overlays, and manipulation of game states, are just a few well-known types of cheating technologies. To this end, anti-cheat developers have created anti-cheat tools and services, which can generally fall into the categories of cheat detection or cheat prevention, among others.

The art of anti-cheat detection includes, in essence, methods or strategies that may determine whether a player is cheating, or a likelihood that the player is cheating. In one example, signatures of certain cheat programs can be identified and added to an anti-cheat library, so that much like an anti-virus program, a gaming device's runtime memory can be scanned to determine whether a cheat program is being executed during gameplay. Unfortunately, because a cheat technology or program's signature must be known in order for it to be identified, such anti-cheat detection methods generally tend to be one step behind the hackers or developers of these cheating technologies.

Another cheat detection method includes the analysis of heuristics to determine a likelihood that a cheat program is being utilized. More specifically, even if the signature of a cheat program is unknown, certain code flow behaviors can be analyzed to determine whether indicators of cheating are present. This cheat detection method, however, isn't full-proof, as more advanced cheating techniques can still go undetected.

Cheat prevention methods, on the other hand, can include techniques for obfuscating game application code, making it difficult for hackers to utilize many of the standard tools available for creating cheats. In addition, developers have learned to sandbox game application processes to prevent common injection techniques, or to prevent external processes from getting a hold of gaming application processes or memory, among other things.

Generally speaking, anti-cheats running on the application layer of a gaming device's operating system can be easily detected. Hackers can thus reverse engineer such anti-cheats and develop workarounds, easily circumventing any detection or prevention strategies employed. To this end, anti-cheat developers have developed anti-cheat kernel driver technologies, which can facilitate their ability to execute anti-cheat detection and prevention modules on the kernel layer of an operating system loaded on the gaming device. While running on the kernel layer, kernel layer anti-cheat modules can validate the state of the gaming device (e.g., its operating system or memory), or in other words, determine that the operating system is safe (e.g., system files are not corrupted, kernel debuggers are not attached, virtual environments are not present, certain high-risk software is not present, self-integrity checks are not failing). Running anti-cheat modules on the kernel layer have thus made it significantly more difficult for hackers to detect and reverse engineer the anti-cheat processes being performed.

While kernel-based anti-cheat technologies have demonstrated success, they now present some loop holes, which are unfortunately being taken advantage of by hackers—to circumvent these kernel level detection and prevention mechanisms. More specifically, in conventional anti-cheat technologies, anti-cheat kernel drivers typically aren't loaded (and thus operating system safety checks aren't performed) until the gaming application or associated anti-cheat application is launched, or in other words executed. A major disadvantage of loading an anti-cheat kernel driver on an ad hoc basis, is that the time between system boot and the launch of the gaming application remains unchecked. In essence, hackers are given the opportunity to tamper with the operating system and memory at any point starting from initial boot until the gaming application is launched and the anti-cheat kernel driver is loaded. Hackers have thus learned to clean up their tracks just prior to the point the anti-cheat kernel driver is loaded, so that the system state is checked and validated at the point in time when the anti-cheat kernel driver is loaded and system validity checks are performed.

As such, various embodiments of the present disclosure are directed to loading an anti-cheat kernel driver while booting a gaming device to prevent tampering of operating system and memory states at any point in time the gaming device is in operation. By loading the anti-cheat kernel driver at boot, the gaming device can assuredly sustain a secure and untampered execution environment in which a gaming application, or anti-cheat tools, can be executed. In some embodiments, this secured execution environment can be utilized to initialize an anti-cheat application that can communicate with a remote anti-cheat server. The remote anti-cheat server can communicate a variety of anti-cheat modules to the gaming device so that the anti-cheat modules can be executed within the secured execution environment in an "on demand" or ad hoc basis. By storing anti-cheat modules remotely on an anti-cheat server, and by sending anti-cheat modules to the gaming device to be executed ad hoc, the opportunity for such modules to be analyzed and reverse engineered on the gaming device is vastly reduced. Further, the anti-cheat modules can generate results that are communicated back to the remote anti-cheat server for analysis. Based on the analysis, the anti-cheat server can determine that a cheating technology has been detected on the gaming device, consequently causing a gaming server to ban or otherwise prohibit further online gameplay for the gaming device or a user account associated with the gaming device.

Turning now to FIG. 1, a schematic depiction is provided illustrating an exemplary system 100 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system in FIG. 1 includes a gaming server 110 that can communicate with a gaming device 120 over a network 130, such as a LAN, WAN, the Internet, or any combination thereof, by way of non-limiting example. The gaming server 110 can host, among other things, an online multiplayer game for a plurality of gaming devices, such as gaming device 120. The gaming server 110 can also communicate with an anti-cheat server 140 over the network 130, and similarly, the anti-cheat server 140 can communicate with each gaming device, such as gaming device 120. In some aspects, the gaming device 120 can establish network connection(s) with each of the gaming server 110 and the anti-cheat server 140 responsive to or based on a game application (e.g., an online multiplayer game) installed on the gaming device 120 being launched. In accordance with various embodiments described herein, each of gaming server 110, gaming device 120, or anti-cheat server 140 can include one or more computing devices as described in more detail with respect to FIG. 6.

The gaming device 120 is preferably associated with a user account that is associated with a user (i.e., a gamer). In some embodiments, the gaming device 120 includes anti-cheat technology that ensures, among other things, that an operating system and memory of the gaming device is not tampered with. Unlike conventional anti-cheat technologies where an anti-cheat kernel driver is loaded at the time a game application is launched (i.e., run, started, executed), the gaming device 120 can load an anti-cheat kernel driver to a memory of the gaming device 120 while an operating system (e.g., Microsoft Windows) is loaded to the memory of the gaming device (i.e., at boot time). The gaming device 120, having the anti-cheat kernel driver loaded during boot, can ensure the integrity of the gaming device 120 (e.g., its operating system and memory) better than conventional anti-cheat technologies, because loading of the anti-cheat kernel driver at boot ensures that operating system or memory tampering cannot take place on the gaming device 120 before a game application is launched.

When the anti-cheat kernel driver is loaded upon boot of the gaming device 120, the gaming device 120 can create a secured environment to run anti-cheat detection or prevention operations, either in a kernel layer or an application layer of the gaming device's 120 operating system. In some embodiments, the gaming device 120 can continuously or periodically perform a variety of measurements and checks, starting upon boot, to ensure a valid system state. In some aspects, if the gaming device 120 determines that its system state is not valid, it can prevent connectivity to either or both the anti-cheat server 140 or gaming server 110.

In some embodiments, the gaming device 120 can establish a session with the anti-cheat server 140 via the network 130. With the secured environment in place, the gaming device 120 can receive, from the anti-cheat server 140 over the network 130, one or more anti-cheat modules. The anti-cheat modules can include, among other things, binaries or executable code that can be executed on the application layer or the kernel layer of the gaming device 120. In some aspects, the anti-cheat server 140 can dynamically select the anti-cheat module of any type (e.g., application mode module, kernel mode module) from a plurality of anti-cheat modules stored in a memory or database coupled to the anti-cheat server 140, and communicate the selected anti-cheat module to the gaming device 120.

In some embodiments, the gaming device 120 can execute the received anti-cheat module. In some aspects, if the anti-cheat module is a kernel mode module, the gaming device 120 can send the received anti-cheat module to the loaded anti-cheat kernel driver, so that the anti-cheat module can be executed on the kernel layer of the gaming device 120. In some other aspects, if the anti-cheat module is a user mode module, the gaming device 120 can simply execute the received anti-cheat module on the application layer of the gaming device 120. Once executed, the gaming device 120 can generate a result from executing the anti-cheat module, and communicate the result back to the anti-cheat server 140 via the network 130.

In some embodiments, the anti-cheat server 140 can receive the result from the gaming device 120 over the network. The anti-cheat server can analyze the result, and determine if the result indicates that the executed anti-cheat module detected a cheating attempt or a form of cheating technology on the gaming device 120. In some aspects, the anti-cheat server 140 can communicate, to the gaming device 120 via the network 130, an instruction to disconnect with the gaming server 110. In some other aspects, the anti-cheat server 140 can communicate, to the gaming server 110 via the network 130, an instruction to take anti-cheat mitigation measures against the gaming device 120. Anti-cheat mitigation measures may include, by way of non-limiting example, banning a user account associated with the gaming device 120, forcing termination of a network connection with the gaming device 120, banning recognized hardware or hardware addresses associated with the gaming device 120 or the like.

Figure 2:
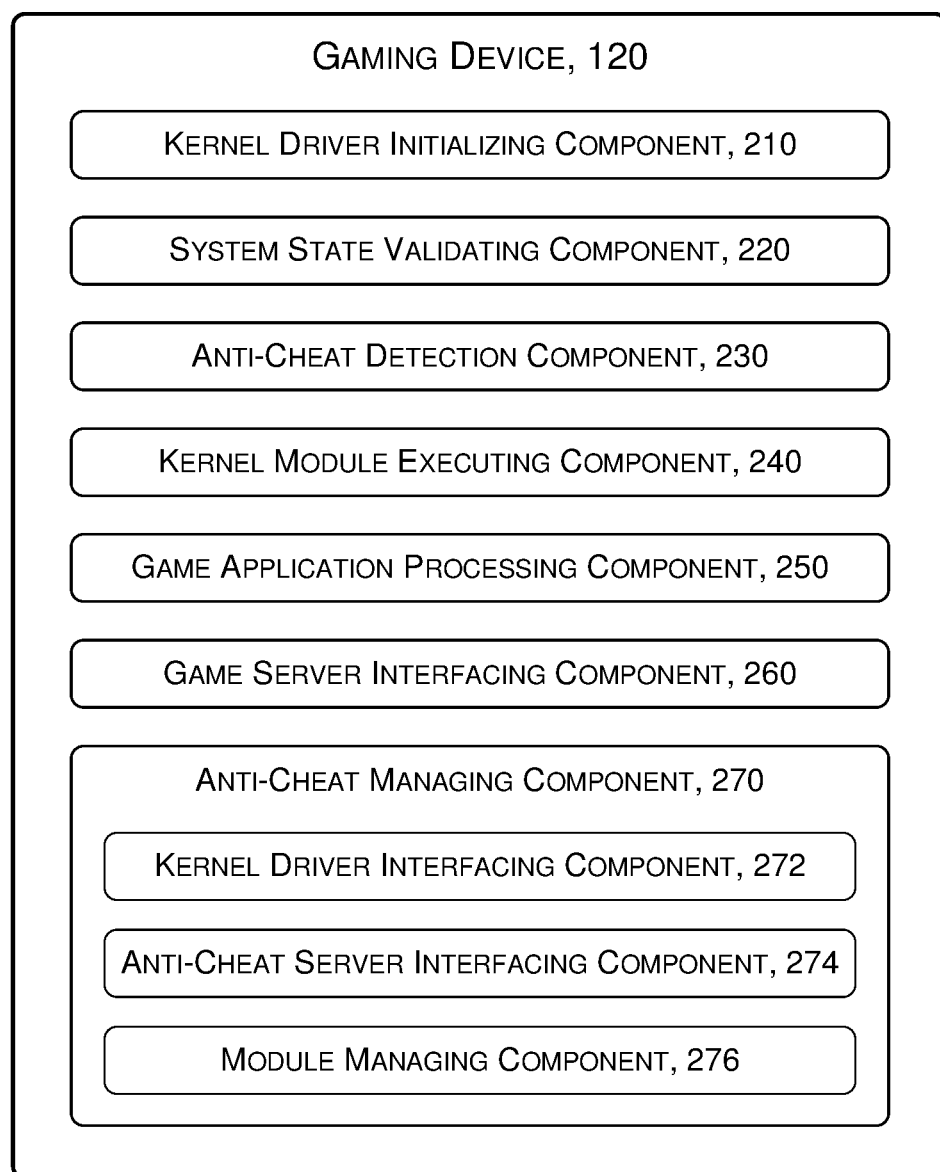
FIG. 2 is an exemplary gaming device in accordance with some embodiments of the present disclosure.
Figure 6:
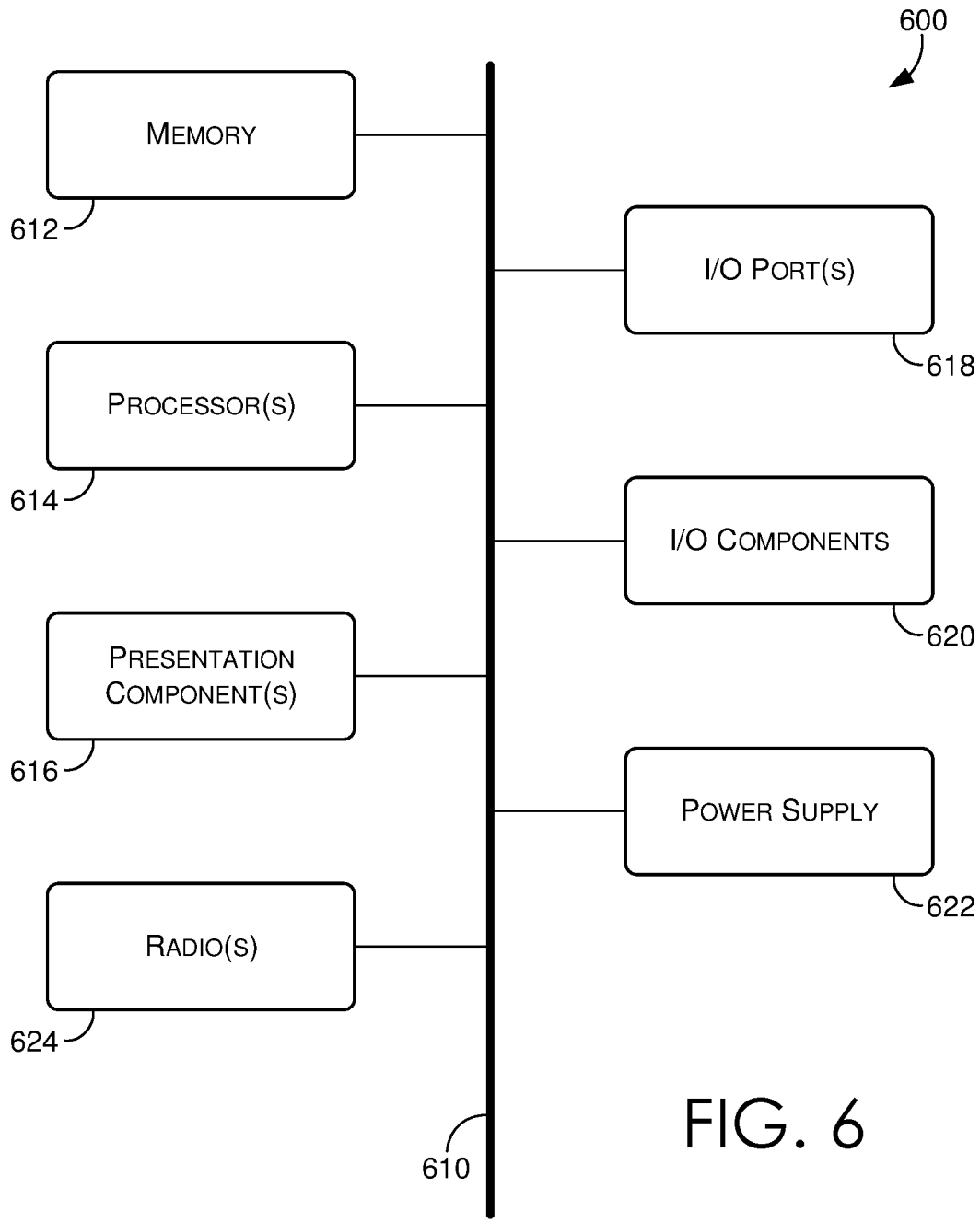
FIG. 6 is a block diagram of an exemplary computing environment suitable for use in implementing some embodiments of the present disclosure.

Referring now to FIG. 2, a block diagram 200 is provided, illustrating an exemplary gaming device 120 (as similarly depicted in FIG. 1) for creating a secured environment to run anti-cheat detection or prevention operations, in which some embodiments of the present disclosure may be employed. In various embodiments, the gaming device 120 can include at least one computing device as depicted in FIG. 6, a gaming console, a handheld gaming device, a mobile device (e.g., a phone, a tablet), or the like. It is contemplated that various components disclosed herein can be implemented in specialized hardware, firmware, software, or a combination thereof, to facilitate the disclosed embodiments. At initial boot (e.g., power on, start-up), the gaming device 120 can load, into a memory of the gaming device 120, an operating system having at least a kernel layer and an application layer. The gaming device 120, once booted, can present a graphical user interface (GUI) to the operating system, and facilitate the launch (e.g., start, execution) of a gaming application, such as an online multiplayer game, installed in a memory of the gaming device 120. In various embodiments, the gaming device 120 can include components and modules that facilitate anti-cheat detection and prevention, as will be described herein. As is also described in accordance with FIG. 1, the gaming device 120 can initialize such anti-cheat mechanisms in response to a detected launch of the gaming application, and can further establish a session between each of a gaming server 110 and an anti-cheat server 140 based on the detected launch.

In some embodiments, the gaming device 120 can include a kernel driver initializing component 210 that loads, into a memory of the gaming device 120, an anti-cheat kernel driver. Although kernel drivers are typically utilized for translating instructions between hardware devices and applications that utilize them, embodiments of the present disclosure load an anti-cheat kernel driver that enables anti-cheat detection and prevention modules to be loaded and executed at the kernel layer. By doing so, anti-cheat detection and prevention operations performed on the kernel layer make it significantly more difficult for hackers to detect and/or reverse engineer such operations. The kernel driver initializing component 210, while loading the anti-cheat kernel driver at boot, can monitor the state of the operating system and memory to determine whether loading of the anti-cheat kernel driver causes system instability or performance issues. In some embodiments, if the kernel driver initializing component 210 detects system instability or performance issues (e.g., a kernel crash), the kernel driver initializing component 210 can dynamically unload, or dynamically prevent from further loading at boot, the anti-cheat kernel driver so that future boots of the gaming device 120 do not result in additional instability or performance issues.

In some embodiments, the gaming device 120 can include a system state validating component 220 that can continuously, periodically, or on an ad hoc basis, validate a state of the loaded operating system and memory for executing a gaming application installed on the gaming device 120, among other things. In other words, with the anti-cheat kernel driver loaded at boot, the system state validating component 220 can perform a variety of checks and measurements on the operating system and memory to ensure that: the operating system's system files are valid at the time of boot, or changes to the operating system's system files weren't tampered with after boot. In some embodiments, the system state validating component 220 can prevent changes to (e.g., sandbox) the operating system's system files.

In some embodiments, the gaming device 120 can include an anti-cheat detection component 230 that can continuously, periodically, or on an ad hoc basis, ensure that no system files have been corrupted or tampered with, no kernel debuggers are being utilized, no virtual environments are being utilized, no high risk or well-known cheating software is being executed, or self-integrity checks of the anti-cheat kernel driver aren't failing, among other things. The anti-cheat detection component 230, with the anti-cheat kernel driver loaded at boot, can scan the operating system and memory for known behaviors and markers associated with such cheating technologies. In some embodiments, if a cheating technology is detected, the anti-cheat detection component 230 can prevent the installed game application from being launched or played until the issue is resolved. In some aspects, the issue can be resolved by removing the offending cheating technology and restarting the gaming device 120.

In some embodiments, the gaming device 120 can include a kernel module executing component 240 that, with the anti-cheat kernel driver loaded at boot, can receive anti-cheat modules to be loaded and executed on the kernel layer or application layer of the gaming device 120. In some aspects, the anti-cheat modules can be executed in either one of a kernel mode or a user mode, depending on the type of module received. In various embodiments, an anti-cheat module received by the kernel module executing component 240 can include an anti-cheat binary or other executable that can be loaded and executed on the kernel layer for detecting specific anti-cheat technologies. The kernel module executing component 240 can, as a result of its execution of a received anti-cheat module, generate a result that can be analyzed to determine whether a specific cheat technology is detected on the gaming device 120.

As will be described, the kernel module executing component 240 can receive any one of a plurality of anti-cheat modules sent from an anti-cheat server (e.g., anti-cheat server 140 of FIG. 1) to the gaming device 120 via a network, such that the anti-cheat module is remotely executed by the gaming device 120 "on demand," or in other words, at the request of the anti-cheat server. In some further embodiments, the anti-cheat module can be deleted by the kernel module executing component 240 immediately upon completion of its execution, so that hackers aren't given the opportunity to analyze the anti-cheat module. It is contemplated that this ad hoc approach for communicating anti-cheat modules, to the gaming device 120 to be executed, makes it difficult for hackers to reverse engineer and analyze the anti-cheat methodologies being utilized.

In various embodiments, the gaming device 120 can include a game application processing component 250 that loads a game application into memory, responsive to a launch of the game application. The game application can include, by way of example, an online multiplayer game. The game application processing component 250 can store, to a memory of the gaming device 120, game states, user account information, and a variety of code or data that facilitates game play. In some further embodiments, game application processing component 250 can communicate with a gaming server interfacing component 260 that establishes a session with a gaming server (e.g., gaming server 110 of FIG. 1) via a network. The game application processing component 250 can communicate, via the gaming server interfacing component 260, user account information (e.g., user name, password), among other things, to obtain access to the gaming server. The game application processing component 250 can exchange game data with the gaming server, and also receive a variety of instructions, notifications, or alerts, via the gaming server interfacing component 260. In some embodiments, a notification or alert can be received from the gaming server via the gaming server interfacing component 260 in response to a determination that an anti-cheat module executed on the gaming device 120 has detected a cheating technology. To this end, the game application processing component 250 can provide for display the notification or alert in a graphical user interface (e.g., via the game application).

In various embodiments, the gaming device 120 can include an anti-cheat managing component 270 that can interface with an anti-cheat kernel driver loaded at boot, exchange data (e.g., anti-cheat modules, results) with an anti-cheat server, and/or execute or delete anti-cheat modules received from the anti-cheat server. In some embodiments, the anti-cheat managing component 270 can include a kernel driver interfacing component 272 that can activate the anti-cheat kernel driver loaded at boot of the gaming device 120. It is contemplated that the kernel driver interfacing component 272 can also load and activate the anti-cheat kernel driver in the event the anti-cheat kernel driver is not loaded at boot. In some embodiments, the kernel driver interfacing component 272 can facilitate the exchange of data between the anti-cheat managing component 270 and one or more components of the gaming device 120, such as the system state validating component 220, the anti-cheat detection component 230, or the kernel module executing component 240, among other things. In essence, the anti-cheat managing component 270 can initialize or start operations (e.g., state validation, anti-cheat detection) that are performed by other such components of the gaming device 120. In some aspects, the kernel driver interfacing component 272 can be employed by anti-cheat managing component 270 to send, to the kernel module executing component 240, anti-cheat modules and instructions to execute the anti-cheat modules. In some further aspects, the kernel driver interfacing component 272 can be employed by anti-cheat managing component 270, to receive results of the executed anti-cheat modules generated by kernel module executing component 240.

In some embodiments, the anti-cheat managing component 270 can include an anti-cheat server interfacing component 274 that establishes a network session between the gaming device 120 and an anti-cheat server, such as anti-cheat server 140 of FIG. 1. It is contemplated that the network session is established based on a detected launch of a gaming application installed on the gaming device 120. It is also contemplated that the gaming application may be associated with the anti-cheat managing component 270. The network session established there between can be employed to exchange data in a continuous, periodic, or ad hoc manner. In some aspects, the anti-cheat server interfacing component 274 can receive an anti-cheat module communicated from the anti-cheat server 140 via the network. In some further aspects, the anti-cheat server interfacing component 274 can send one or more results generated based on the received anti-cheat module being executed on the gaming device 120. In some embodiments, the anti-cheat server interfacing component 274 can receive instructions from the anti-cheat server 140 that define which anti-cheat module(s) are to be executed, when such anti-cheat module(s) are to be executed, or when such anti-cheat module(s) are to be deleted by the gaming device 120.

In some embodiments, the anti-cheat managing component 270 can include a module managing component 276 that manages anti-cheat modules received from the anti-cheat server 140 based on the instructions received from the anti-cheat server 140 via anti-cheat server interfacing component 274. In some aspects, and as briefly discussed above, the instructions received can include specific tasks (e.g., module execution, timing, disposal) to be performed on the gaming device 120. In this regard, the module managing component 276 can interpret instructions received from the anti-cheat server 140 and accordingly manage the anti-cheat modules received therefrom. It is contemplated that the anti-cheat managing component 270 can communicate with at least the kernel driver interfacing component 272 to load, execute, or unload modules from the kernel layer of the gaming device 120.

Figure 3:
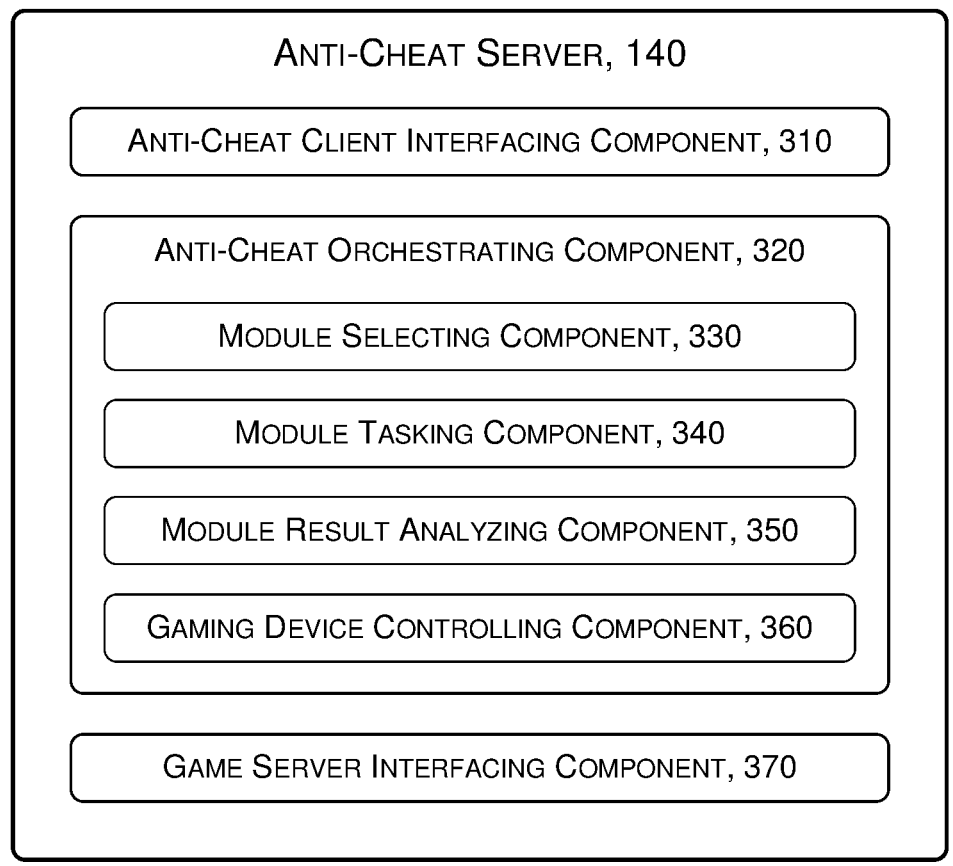
FIG. 3 is an exemplary anti-cheat server in accordance with some embodiments of the present disclosure.

Looking now to FIG. 3, a block diagram 300 is provided illustrating an exemplary anti-cheat server 140, as is similarly depicted in FIG. 1, for remotely managing the receipt, loading, execution, and/or deletion of anti-cheat modules on a gaming device (e.g., gaming device 120 of FIGS. 1 and 2) in which some embodiments of the present disclosure may be employed. In various embodiments, the anti-cheat server 140 can include at least one computing device as depicted in FIG. 6. It is contemplated that various components disclosed herein can be implemented in specialized hardware, firmware, software, or a combination thereof, to facilitate the disclosed embodiments.

In some embodiments, the anti-cheat server 140 can include an anti-cheat client interfacing component 310 that facilitates communications with the gaming device 120, so that, among other things, anti-cheat operations on the gaming device 120 can be remotely managed. The anti-cheat server 140 can employ anti-cheat client interfacing component 310 to establish a session with the gaming device 120, via the network, based on a session request being received from the gaming device 120. In accordance with some embodiments, the anti-cheat server 140 can employ the anti-cheat client interfacing component 310 to communicate, via the established network session, one or more anti-cheat modules to the gaming device 120 to be executed thereon. In return, the anti-cheat server 140 can receive result(s) of the executed anti-cheat modules, via the same or subsequently established session, for analysis and to make a subsequent determination on whether the gaming device 120 is utilizing cheating technology.

In some embodiments, at a high level, the anti-cheat server 140 can include an anti-cheat orchestrating component 320 that autonomously: selects an anti-cheat module for communication to the gaming device 120; generates and communicates instructions that command the gaming device 120 how or when to load, execute, or delete the anti-cheat module; analyzes results of an anti-cheat module executed on the gaming device 120; or generates and communicates instructions that command the gaming device 120 how to behave (e.g., standby, disconnect) after performing an anti-cheat module results analysis.

In accordance with some embodiments, the anti-cheat orchestrating component 320 can include a module selecting component 330 that selects an anti-cheat module from a plurality of anti-cheat modules. In various embodiments, the plurality of anti-cheat modules can include, among other things, kernel mode anti-cheat modules or user mode anti-cheat modules. The anti-cheat modules can be stored in a database or other memory device coupled to the anti-cheat server 140. As is described herein above, the storage of anti-cheat modules apart from the gaming device 120 makes it difficult for hackers to anticipate the anti-cheat being executed, and also difficult to reverse engineer the anti-cheat. It is contemplated that the module selecting component 330 can select an anti-cheat module for communication and execution based on one or more selection rulesets. By way of example, a selection ruleset can be defined based on certain environments in which a particular set of online multiplayer games are to be played. For instance, the selection of one or more anti-cheat module(s) in a particular order, combination, or type may differ depending on whether a series of professional eSports games are being played versus whether everyday users are playing the game.

In accordance with some embodiments, the anti-cheat orchestrating component 320 can include a module tasking component 340 that generates instructions to send to the gaming device 120 via a session established therewith. The instructions can be embodied as electronic messages that may include, among other things, binaries or other executables of an anti-cheat module, commands defining when or where (e.g., kernel layer, application layer) to execute the anti-cheat module, or other directives that task the gaming device 120 with certain operations that facilitate anti-cheat detection and prevention. In some aspects, the messages can include commands that instruct the gaming device to store or delete the anti-cheat module after execution, though in preferred embodiments, the gaming device can autonomously delete the anti-cheat module upon execution and/or communication of its results to the anti-cheat server 140.

In accordance with some embodiments, the anti-cheat orchestrating component 320 can include a module result analyzing component 350 that receives, via the anti-cheat client interfacing component 310, a report from the gaming device 120 in response to on an anti-cheat module, sent from the anti-cheat server 140, having been executed on the gaming device 120. In some embodiments, the report can include a binary result (e.g., cheating detected, cheating not detected) of the executed anti-cheat module, among other things. In some other embodiments, the report can include statistics or unstructured data collected by the executed anti-cheat module. In this way, certain heuristics or data analytics can be evaluated to determine a likelihood or to establish a confirmation of cheating on the gaming device 120. The module result analyzing component 350 can thus analyze the report to determine whether cheating was detected or prevented on the gaming device 120 by the executed anti-cheat module. In some embodiments, if a determination is made that the gaming device 120 was cheating, the module result analyzing component 350 can perform various anti-cheat mitigation operations, as will be described.

In accordance with some embodiments, the anti-cheat orchestrating component 320 can include a gaming device controlling component 360 that can generate messages to be communicated, via anti-cheat client interfacing component 310, to the gaming device 120 for controlling certain actions of the gaming device 120. In some aspects, the messages can include commands that direct the gaming device 120 to perform specific operations. By way of example, a message can include a command that instructs the gaming device 120 to disconnect from the anti-cheat server 140 or the gaming server 110. The disconnect command can be included in a new message generated in response to the module result analyzing component 350 making a determination that the gaming device 120 was utilizing cheating technology. It is contemplated that in some aspects, the command can also prevent the gaming device 120 from establishing future sessions with the anti-cheat server 140 or gaming server 110. In another example, a message can include a command that instructs the gaming device 120 to standby and wait for another message, instruction, or command from the anti-cheat server 140.

In some embodiments, the anti-cheat server 140 can include a game server interfacing component 370 that can communicate electronic messages with a gaming server (e.g., gaming server 110 of FIG. 1), and inform the gaming server 110 whether the gaming device 120 is approved or denied for online multiplayer gaming on the gaming server 110. In some instances, the anti-cheat server 140 can send continuous or periodic messages to the gaming server 110, informing the gaming server 110 the anti-cheat detection status of the gaming device 120. In other words, if the anti-cheat server 140 determines, based on results received from the gaming device 120, that the gaming device 120 is utilizing cheating technology, the anti-cheat server 140 can responsively communicate anti-cheat mitigation instructions to the gaming server 110. It is contemplated that such instructions can include a confirmation or likelihood of cheating on the gaming device 120, a user account associated with the gaming device 120, hardware signature(s) associated with the gaming device 120, characteristics and/or severity of the detected cheat, network information (e.g., IP address), and/or any other identifying information associated with the gaming device 120, among other things.

Figure 4:
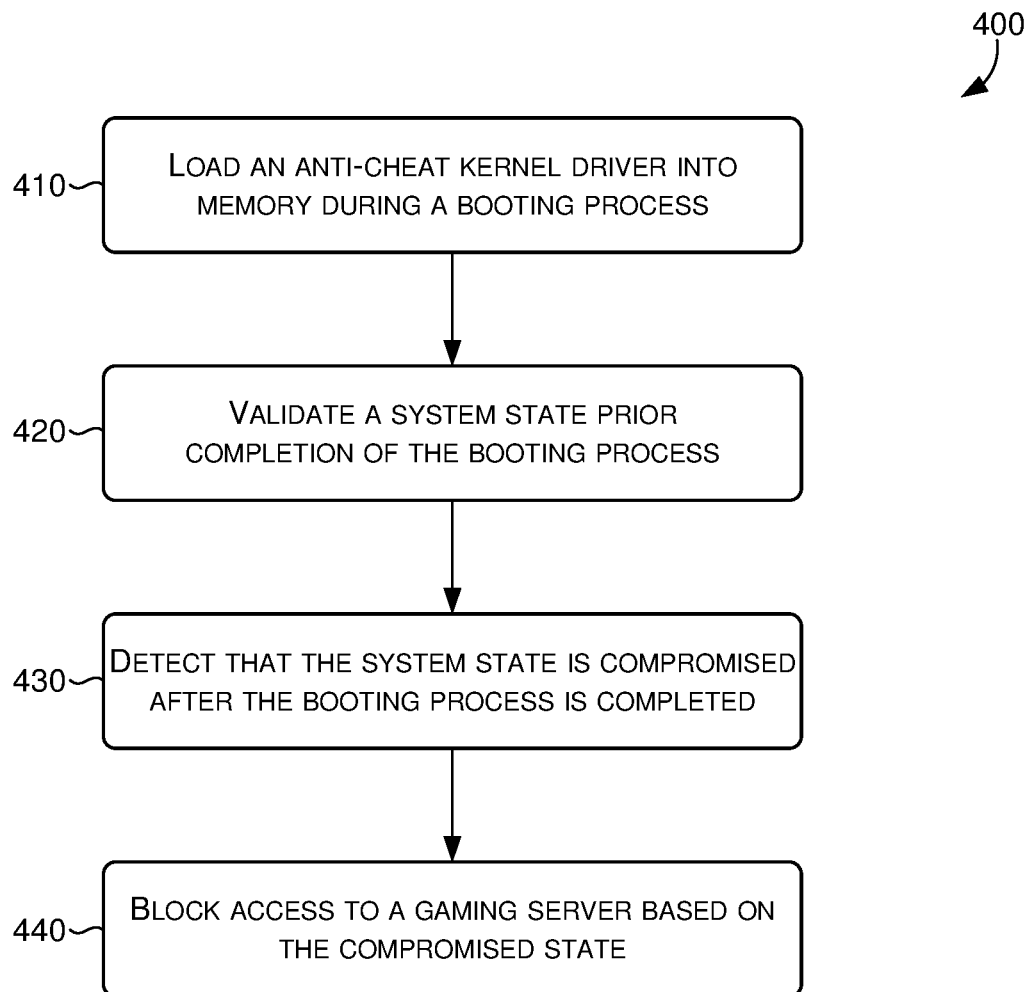
FIG. 4 is a flow diagram showing a method for anti-cheat detection in accordance with some embodiments of the present disclosure.

Referring now to FIG. 4, a flow diagram is provided that illustrates a method for anti-cheat detection. The method also facilitates blocking a gaming device (e.g., gaming device 120 of FIGS. 1 and 2) from accessing a gaming server (e.g., gaming server 110 of FIG. 1) based on a detected compromised system state (i.e., a system determined to have been tampered with). As shown at block 410, a gaming device can employ a kernel driver initializing component, such as kernel driver initializing component 210 of FIG. 2, to load an anti-cheat kernel driver to memory during a booting process of the gaming device. In various embodiments, the gaming device can employ the kernel driver initializing component to perform stability checks while monitoring the operating system and memory to ensure that the anti-cheat kernel driver is properly loaded, stable, and will not cause system instability. For instance, the gaming device can track when kernel crashes or panics occur as a result of loading the anti-cheat kernel driver. To this end, the gaming device can employ the kernel driver initializing component to dynamically modify its boot process and prevent repeated kernel crashes or panics from occurring.

Based on the anti-cheat kernel driver being loaded to memory during the booting process, the gaming device, at block 420, can employ a system state validating component (e.g., system state validating component 220 of FIG. 2) to perform a series of checks on operating system files, the memory of the gaming device, and other aspects of the operating system, to determine a valid state of the gaming device. Preferably, these checks are performed prior to completion of the boot process of the gaming device. In this way, advanced attempts to thwart system state validations performed only at the time of launching a gaming application, as in conventional anti-cheat technologies, can be prevented.

At block 430, the gaming device, having the anti-cheat kernel driver loaded during the booting process, can employ an anti-cheat detection component (e.g., anti-cheat detection component 230 of FIG. 2) that includes a series of detection vectors or operations for detecting whether the system state (e.g., block(s) of memory or system files) are tampered with after the anti-cheat kernel driver is loaded. In some embodiments, the gaming device can continuously or periodically employ the anti-cheat detection component to track (e.g., store in memory, set flags, identify) and store characteristics of the system state or any attempts to tamper with the system state. More specifically, by virtue of the anti-cheat kernel driver being loaded at boot, the anti-cheat detection component can effectively sandbox block(s) of memory and/or system files before a variety of cheat technologies can tamper with the system state. However, if attempts are made to tamper with the system state after the anti-cheat kernel driver is loaded, the anti-cheat detection component can be employed to track these attempts and further track the tampered state of the gaming device. In some other embodiments, the gaming device can simply compare a first system state determined valid at the time of boot, to a state determined at a later time (e.g., when a gaming application is launched), for determining whether the state of the gaming device has changed.

At block 440, the anti-cheat detection component of the gaming device can, based on a determination that the system state is invalid or has been tampered with, block access between the gaming device 120 and the gaming server 110, effectively preventing the gaming device from participating in any online multiplayer games hosted on the gaming server. In various embodiments, the anti-cheat detection component can send a status of the system state to a game application processing component (e.g., game application processing component 250 of FIG. 2), a game server interfacing component (e.g., gamer server interfacing component 260 of FIG. 2), and/or an anti-cheat server interfacing component (e.g., anti-cheat server interfacing component 274 of FIG. 2), to effectively prevent the gaming device from participating in online gameplay via the gaming server. By way of non-limiting example, online gaming participation can be prevented by blocking the host address of a gaming server or anti-cheat server, blocking network connections to the gaming server or anti-cheat server, preventing the gaming application from establishing outgoing connections to the gaming server, sending an invalid system state to the anti-cheat server, or any combination thereof. In some embodiments, the anti-cheat detection component 230 can independently, or through the game application processing component 250, generate a notification that causes the gaming device to provide the notification for display to a display coupled to the gaming device. In some aspects, the notification can notify the user of the gaming device that the detected cheat technology needs to be uninstalled and the gaming device restarted so that online gaming participation can be enabled.

Figure 5:
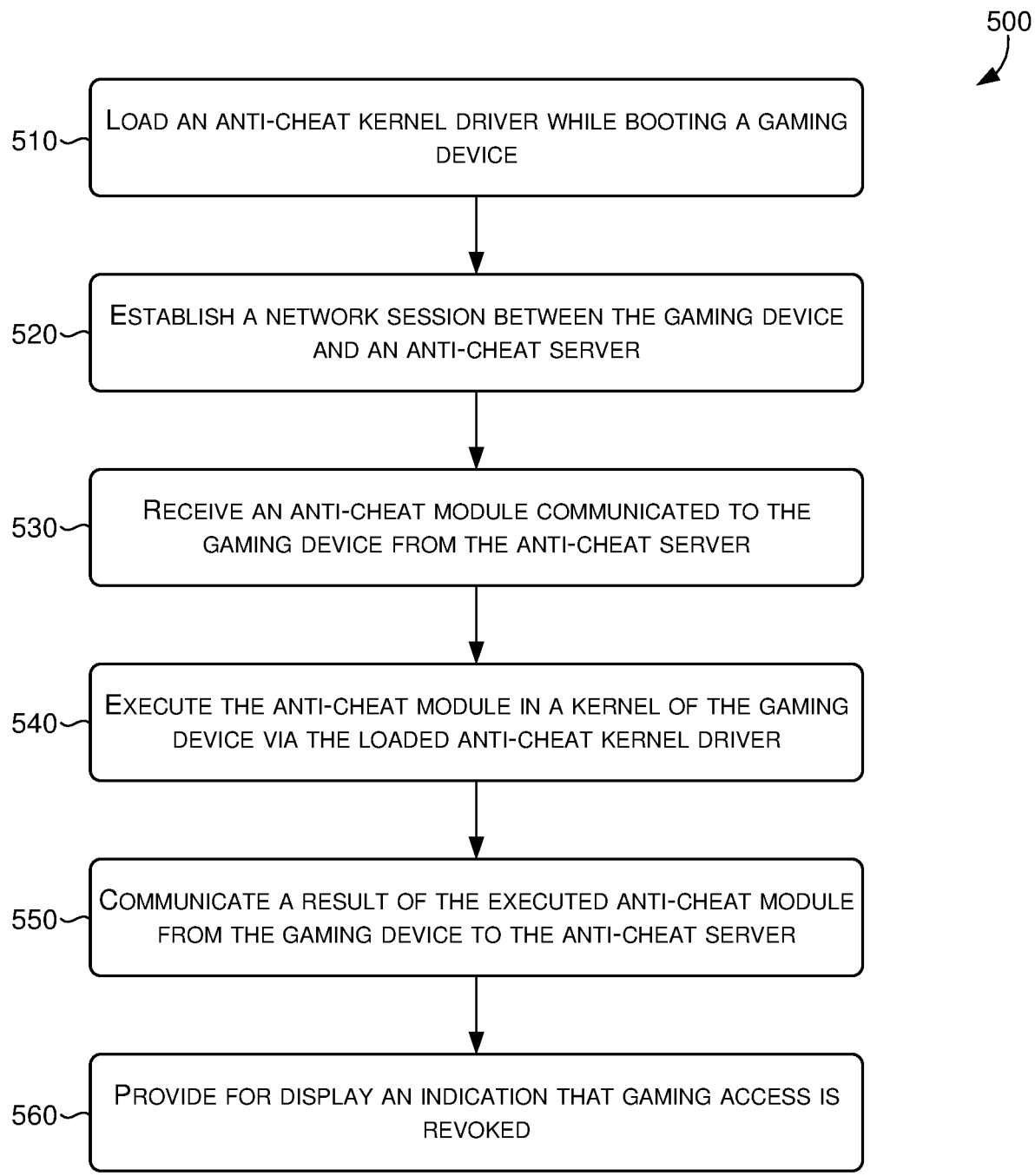
FIG. 5 is a flow diagram showing another method for anti-cheat detection in accordance with some embodiments of the present disclosure.

Referring now to FIG. 5, a flow diagram is provided that illustrates a method for anti-cheat detection. As shown at block 510, a gaming device (e.g., gaming device 120 of FIGS. 1 and 2) can employ a kernel driver initializing component (e.g., kernel driver initializing component 210 of FIG. 2), to load an anti-cheat kernel driver to memory during a booting process of the gaming device. In various embodiments, the gaming device can employ the kernel driver initializing component to perform stability checks while monitoring the operating system and memory, to ensure that the anti-cheat kernel driver is properly loaded, stable, and will not cause system instability. For instance, the gaming device can track when kernel crashes or panics occur as a result of loading the anti-cheat kernel driver. To this end, the gaming device can employ the kernel driver initializing component to dynamically modify its boot process and prevent repeated kernel crashes or panics from occurring.

In accordance with some embodiments, the gaming device can employ a system state validating component (e.g., system state validating component 220 of FIG. 2) to perform a series of checks on operating system files, the memory of the gaming device, and other aspects of the operating system, to determine a valid state of the gaming device by virtue of the anti-cheat kernel driver being loaded to memory during the booting process. Such checks are preferably performed prior to completion of the boot process of the gaming device. In this way, advanced attempts to thwart system state validations performed only at the time of launching a gaming application, as in conventional anti-cheat technologies, can be prevented. The gaming device, having the anti-cheat kernel driver loaded during the booting process, can employ an anti-cheat detection component (e.g., anti-cheat detection component 230 of FIG. 2) that includes a series of detection vectors or operations for detecting whether the system state (e.g., block(s) of memory or system files) are tampered with after the anti-cheat kernel driver is loaded. In some embodiments, the gaming device can continuously or periodically employ the anti-cheat detection component to track and store the system state or any attempts to tamper with the system state. More specifically, by virtue of the anti-cheat kernel driver being loaded at boot, the anti-cheat detection component can effectively sandbox block(s) of memory and/or system files before a variety of cheat technologies can tamper with the system state. However, if attempts are made to tamper with the system state after the anti-cheat kernel driver is loaded, the anti-cheat detection component can be employed to track these attempts and further track the tampered state of the gaming device.

The anti-cheat detection component of the gaming device can, based on a determination that the system state is valid, enable access between the gaming device 120 and the gaming server 110, so that the gaming device can participate in online multiplayer games hosted on the gaming server. In various embodiments, the anti-cheat detection component can send a status of the system state to a game application processing component (e.g., game application processing component 250 of FIG. 2), a game server interfacing component (e.g., gamer server interfacing component 260 of FIG. 2), and/or an anti-cheat server interfacing component (e.g., anti-cheat server interfacing component 274 of FIG. 2), to facilitate connectivity between the gaming device and the gaming server.

As shown in block 520, in accordance with some embodiments, the gaming device can employ the anti-cheat server interfacing component to establish a session with the anti-cheat server via the network. In some aspects, the session can be established based on a detected launch of a gaming application associated with either or both the gaming server or anti-cheat server. In some aspects, the session with the anti-cheat server is established and/or active at the same time as another session established between the gaming device and the gaming server.

An anti-cheat managing component (e.g., anti-cheat managing component 270 of FIG. 2) can facilitate communications between the anti-cheat server (e.g., via the anti-cheat server interfacing component) and the kernel of the gaming device, the gaming device employing a kernel driver interfacing component (e.g., kernel driver interfacing component 272) to communicate with the loaded anti-cheat kernel driver. Thus, at block 530, the gaming device can receive, via the anti-cheat server interfacing component and from the anti-cheat server over the network, an anti-cheat module selected for communication to the gaming device. In some embodiments, the kernel driver interfacing component can send the received anti-cheat module to a kernel module executing component (e.g., kernel module executing component 240 of FIG. 2) of the gaming device.

In accordance with some embodiments, the kernel module executing component can reside in a block of memory that is validated and monitored by the system state validating component of the gaming device. In this way, the kernel module executing component, at block 540, can execute anti-cheat modules on a determined valid and secured kernel layer of the gaming device. As described herein, instructions for how or when the anti-cheat module is to be executed can also be communicated to the gaming device from the anti-cheat server. To this end, the gaming device may include a module managing component that can moderate how and when the anti-cheat modules are sent to the kernel module executing component.

In some embodiments, the kernel module executing component can generate a report or result based on the execution of an anti-cheat module. Thus, at block 550, the kernel module executing component can send the result of the executed anti-cheat module from the kernel layer to the anti-cheat server interfacing component, so that the anti-cheat server interfacing component can communicate the result to the anti-cheat server over the network.

In accordance with some embodiments, the anti-cheat server (e.g., anti-cheat server 140 of FIGS. 1 and 3) can receive and analyze the result of the executed anti-cheat module. In some aspects, the anti-cheat server can make an absolute determination that a gaming device is utilizing cheating technologies, or a confident determination that a gaming device is utilizing cheating technologies based on a threshold level of confidence. In the event the anti-cheat server determines that the gaming device is utilizing cheating technology, the anti-cheat server can send a message to the gaming server, instructing the gaming server to boot, disconnect, or ban a user account associated with the gaming device, the gaming device itself, a network address of the gaming device, hardware signatures or address(es) associated with the gaming device, or the like. In some aspects, the anti-cheat server can send a message to the gaming device with an instruction to disconnect or prohibit access to the gaming server. It is contemplated that in order for a gaming device to maintain a gaming session, or in some aspects, maintain network connectivity with a gaming server to enable online play, the gaming device must also have an established connection or demonstrated ability to connect to the anti-cheat server upon request or on a periodic basis. In this way, tampering with the gaming device can have a reduced effect on anti-cheat mitigation measures taken by the anti-cheat server or gaming server.

As described herein, when the gaming server receives a message from the anti-cheat server—instructing the gaming server to take anti-cheat measures (e.g., boot, disconnect, or ban)—the gaming server can terminate the network session established between the gaming server and the gaming device. In some other embodiments, the gaming server can terminate any ongoing gaming sessions in which the gaming device is participating. In some even further embodiments, the gaming server can generate a notification that is communicated to the gaming device over the network, so that based upon the termination of the gaming session or upon termination of the established network session, the gaming device can provide for display the communicated notification. In various aspects, the displayed notification can include a notice that a cheating technology was detected or prevented on the gaming device. In some further aspects, the notification can indicate the punishment (e.g., temporary ban, permanent ban) imposed on the gaming device or user account associated therewith.

Having described embodiments of the present disclosure, an exemplary operating environment in which embodiments of the present disclosure may be implemented is described below in order to provide a general context for various aspects of the present disclosure. Referring initially to FIG. 6 in particular, an exemplary operating environment for implementing embodiments of the present disclosure is shown and designated generally as computing device 600. Computing device 600 is but one example of a suitable computing environment and is not intended to suggest any limitation as to the scope of use or functionality of the disclosed embodiments. Neither should the computing device 600 be interpreted as having any dependency or requirement relating to any one or combination of components illustrated.

The embodiments herein may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The described embodiments may be practiced in a variety of system configurations, including hand-held devices, consumer electronics, general-purpose computers, more specialty computing devices, etc. The described embodiments may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present disclosure provide for, among other things, systems and methods for anti-cheat detection. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that embodiments of the present disclosure are one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized system, comprising:
   at least one processor, and
   at least one computer storage media storing computer-usable instructions that, when used by the at least one processor, cause the at least one processor to:
   load an anti-cheat kernel driver into a memory of the computerized system prior to a completion of a booting process of the computerized system;
   prior to the completion of the booting process, validate a system state of the computerized system via the loaded anti-cheat kernel driver;
   after the booting process is completed, detect, via the loaded anti-cheat kernel driver, a change to the system state;
   determine, via the loaded anti-cheat kernel driver, that the system state is compromised based on the detected change to the system state; and
   provide for display a graphical notification indicative of the determined compromised system state.

2. The system of claim 1, the operations further causing the at least one processor to:
   send an indication that the system state is compromised to a remote anti-cheat server via a network; and
   receive an instruction from the remote anti-cheat server to prevent access to at least one of a gaming server or the remote anti-cheat server.

3. The system of claim 2, wherein to prevent access to the gaming server includes one of terminating an established connection with the remote anti-cheat server or preventing network connectivity with the remote anti-cheat server.

4. The system of claim 1, the operations further causing the at least one processor to:
   monitor a stability and performance of the gaming device while the anti-cheat kernel is being loaded.

5. The system of claim 1, wherein the system state is validated based at least in part on gaming device stability.

6. The system of claim 1, wherein the determining that the system state is compromised is performed on a kernel layer of the gaming device.

7. The system of claim 6, wherein a set of system files and one or more blocks of memory in the memory are monitored and analyzed to validate the system state and/or determine that the system state is compromised.

8. The system of claim 1, the operations further causing the at least one processor to
   block access to a gaming server associated with a game application based on the determined compromised system state, wherein the game application is associated with the anti-cheat kernel driver.

9. A computer-implemented method for anti-cheat detection, the method comprising:
   establishing a first network session between an anti-cheat server and a gaming device;
   selecting an anti-cheat module from a plurality of anti-cheat modules stored on the anti-cheat server;
   communicating the anti-cheat module from the anti-cheat server to the gaming device via the first network session;
   causing the gaming device to execute the anti-cheat module in response to the anti-cheat module being communicated, the anti-cheat module being executed via an anti-cheat kernel driver loaded into a memory of the gaming device;
   receiving, by the anti-cheat server, a result of the executed anti-cheat module from the gaming device;
   determining, by the anti-cheat server, that the result is indicative of a compromised system state of the gaming device; and
   causing termination of a second network session established between the gaming device and a gaming server based on the determination that the result is indicative of the compromised system state.

10. The method of claim 9, wherein the second network session and the first network session are established in parallel.

11. The method of claim 9, wherein the gaming device is configured to delete the anti-cheat module from the memory after execution thereof.

12. The method of claim 9, the anti-cheat module being selected from the plurality of anti-cheat modules based on a module selection rule set.

13. The method of claim 9, further comprising:
   periodically communicating, by the anti-cheat server, a message corresponding to a system state of the gaming device to the gaming server.

14. The method of claim 13, wherein the gaming server is configured to terminate the second network session based on the message being indicative of the compromised system state.

15. The method of claim 13, wherein the gaming server is configured to terminate the second network session based on the message not being communicated.

16. A computerized system, comprising:
   at least one processor, and
   at least one computer storage media storing computer-usable instructions that, when used by the at least one processor, cause the at least one processor to:

establish a first network session between an anti-cheat server and a gaming device;
select an anti-cheat module from a plurality of anti-cheat modules stored on the anti-cheat server;
communicate the anti-cheat module from the anti-cheat server to the gaming device via the first network session;
cause the gaming device to execute the anti-cheat module in response to the anti-cheat module being communicated, the anti-cheat module being executed via an anti-cheat kernel driver loaded into a memory of the gaming device;
receive, by the anti-cheat server, a result of the executed anti-cheat module from the gaming device;
determine, by the anti-cheat server, that the result is indicative of a compromised system state of the gaming device; and
cause termination of a second network session established between the gaming device and a gaming server based on the determination that the result is indicative of the compromised system state.

17. The system of claim 16, wherein the second network session and the first network session are established in parallel.

18. The system of claim 16, wherein the gaming device is configured to delete the anti-cheat module from the memory after execution thereof.

19. The system of claim 16, the anti-cheat module being selected from the plurality of anti-cheat modules based on a module selection rule set.

20. The system of claim 16, further comprising:

periodically communicating, by the anti-cheat server, a message corresponding to a system state of the gaming device to the gaming server, wherein the gaming server is configured to terminate the second network session based on one of the message being indicative of the compromised system state or the message not being communicated.

\* \* \* \* \*